(12) United States Patent
Van Endert

(10) Patent No.: US 6,313,884 B1
(45) Date of Patent: Nov. 6, 2001

(54) GAMMA CORRECTION

(75) Inventor: Tony P. Van Endert, Hasselt (BE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/053,455

(22) Filed: Apr. 1, 1998

(30) Foreign Application Priority Data

Apr. 7, 1997 (EP) .................................................. 97201018

(51) Int. Cl.$^7$ .................................................. H04N 5/202
(52) U.S. Cl. .......................... 348/674; 348/677; 348/254; 358/519
(58) Field of Search .................................... 348/674, 675, 348/676, 677, 254, 255; 358/519

(56) References Cited

U.S. PATENT DOCUMENTS

| | | | |
|---|---|---|---|
| 3,708,615 | 1/1973 | Wharton | 178/5.4 T |
| 3,836,706 | * 9/1974 | Keegan et al. | 348/674 |
| 4,689,678 | * 8/1987 | Klemmer | 348/677 |
| 5,335,068 | * 8/1994 | Hanajima | 348/674 |
| 5,455,635 | * 10/1995 | Keller | 348/674 |
| 5,539,459 | * 7/1996 | Bullitt et al. | 348/675 |
| 5,900,918 | * 5/1999 | White | 348/674 |
| 5,990,979 | * 11/1999 | Koyama et al. | 348/674 |

FOREIGN PATENT DOCUMENTS 06261228A  3/1993  (JP) ................................ H04N/5/202

* cited by examiner

Primary Examiner—Reinhard J. Eisenzopf
Assistant Examiner—Trang U. Tran
(74) Attorney, Agent, or Firm—Edward W. Goodman

(57) ABSTRACT

A gamma correction circuit includes an amplifier (A) coupled to receive an input signal (Vi), and a non-linear impedance (Rg) coupled to the amplifier (A) for determining a gain of the gamma correction circuit in such a manner that the gain increases when the input signal (Vi) increases.

3 Claims, 1 Drawing Sheet

GAMMA CORRECTION

BACKGROUND OF THE INVENTION

1. Field of the Invention

The invention relates to a gamma correction circuit, and to a display apparatus, e.g., a TV set or a PC (plus) monitor, comprising such a gamma correction circuit.

2. Description of the Related Art

The use of gamma correction is well known, as the gamma at the camera side does not exactly match the gamma of a CRT display. When LCD display devices are used, a gamma correction is also required as the LCD gamma is far stronger than the gamma at the camera side, so that the camera gamma should be augmented by a correction gamma in order to compensate the LCD display gamma.

U.S. Pat. No. 4,847,524 discloses a gamma correction circuit for use at the camera side. It has not less than 8 transistors.

U.S. Pat. No. 5,258,658 shows a gamma correction circuit for use with an LCD display. The gamma correction circuit is rather complex and has no less than 13 transistors.

SUMMARY OF THE INVENTION

It is, inter alia, an object of the invention to provide a simple and effective gamma correction circuit. To this end, a first aspect of the invention provides a gamma correction circuit which comprises an amplifier coupled to receive an input signal, and a non-linear impedance coupled to the amplifier for determining a gain of the gamma correction circuit in such a manner that the gain increases when the input signal increases. A second aspect of the invention provides a display apparatus comprising such a circuit.

The gamma correction circuit of the present invention is particularly suitable for use with a linear display, such as a plasma display, in which the light output is linearly dependent on the input signal amplitude. With such a display, the camera gamma should be completely compensated before the signal is applied to the display.

These and other aspects of the invention will be apparent from and elucidated with reference to the embodiments described hereinafter.

DESCRIPTION OF THE PREFERRED EMBODIMENTS

Figure 1:
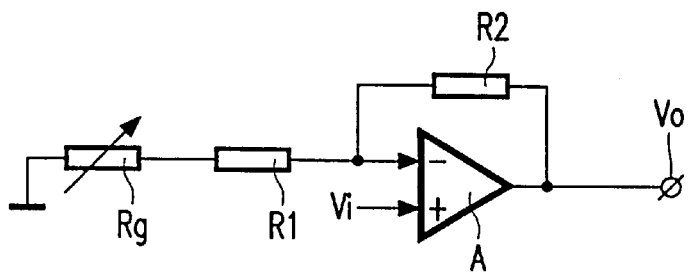
FIG. 1 shows a basic block diagram of a gamma correction circuit in accordance with the present invention.

In the gamma correction circuit of FIG. 1, an input voltage Vi is applied to a non-inverting input (+) of an amplifier A. An inverting input (−) of the amplifier A is connected to ground through a series connection of a resistor R1 and a non-linear voltage dependent impedance Rg. An output of the amplifier supplies an output voltage Vo. The amplifier A is fed back by means of a resistor R2 between the output and the inverting input of the amplifier A. The transfer of the impedance Rg is such that a small gain is obtained for small input signals, while a high gain is obtained for large input signals. Obviously, it is also possible to put the impedance Rg in the feedback path of the amplifier A if its characteristics are swapped in such a manner that the overall transfer of the gamma correction circuit remains small for small input signals and large for large input signals.

Figure 2:
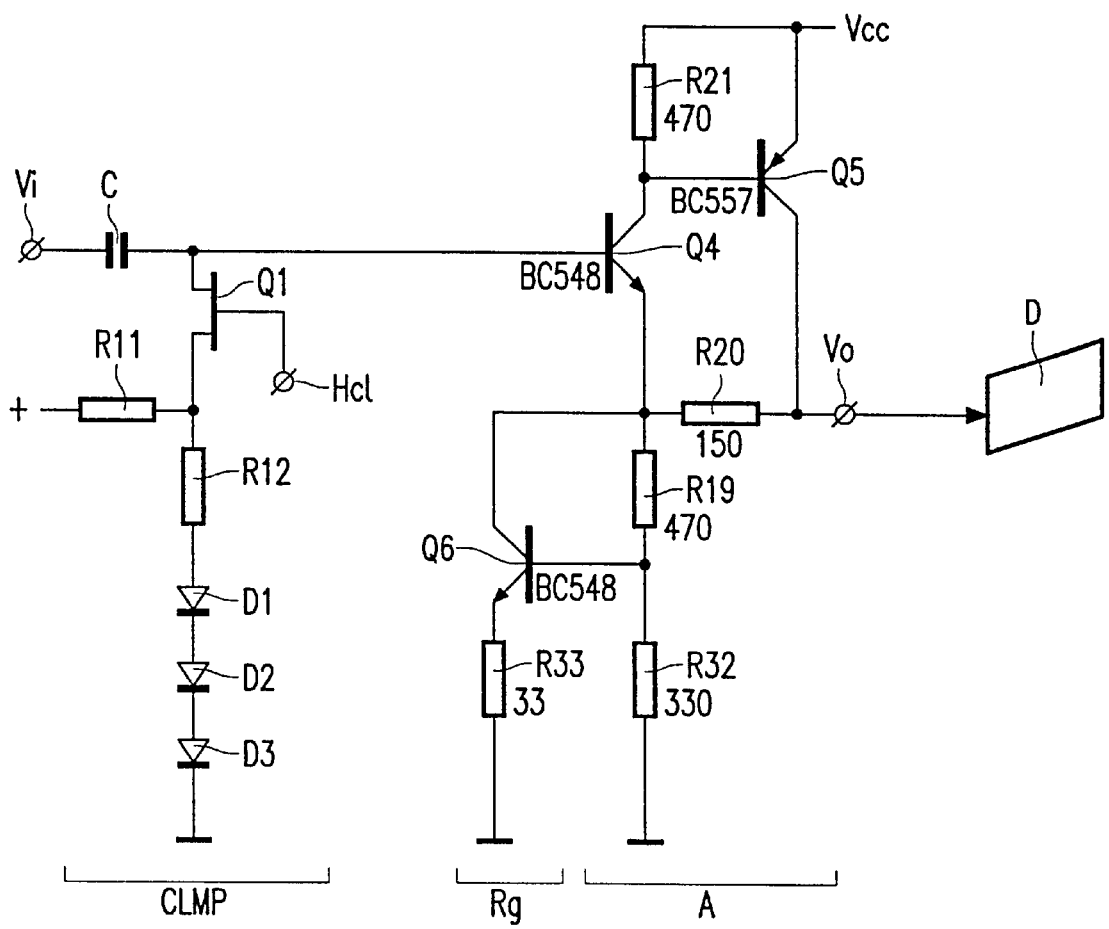
FIG. 2 shows a preferred embodiment of a display apparatus in accordance with the present invention.

FIG. 2 shows a preferred embodiment of a display apparatus in accordance with the present invention. The input signal Vi is applied to a clamp circuit CLMP. The clamp circuit CLMP includes a capacitor C having one end receiving the input signal Vi and another end which is connected to ground through a series connection of a transistor Q1 controlled by a clamp pulse Hcl, a resistor R12, and three diodes D1, D2, D3. A resistor R11 connects the connection point of the transistor Q1 and the resistor R12 to a bias voltage. The clamp circuit CLMP is temperature dependent to compensate the temperature dependency of the gamma correction circuit.

The input voltage Vi is connected to the amplifier A through the capacitor C. The amplifier A comprises an NPN transistor Q4 having a base connected to the capacitor C, a collector coupled to a positive supply voltage Vcc through a resistor R21, and an emitter which is connected to an output terminal (Vo) through a resistor R20. The emitter of the NPN transistor Q4 is coupled to ground through a series connection of a resistor R19 and a resistor R32. A PNP transistor Q5 has an emitter connected to the positive supply voltage, a base connected to the collector of the NPN transistor Q4, and a collector connected to the output terminal (Vo).

The non-linear impedance Rg is implemented by an NPN transistor Q6 having a collector connected to the emitter of the NPN transistor Q4, a base connected to the connection point of the resistors R19 and R32, and an emitter connected to ground through a resistor R33. by means of resistor R32, a current is measured which depends on the input signal Vi. If the voltage across resistor R32 reaches the threshold level of the base-emitter of transistor Q6, transistor Q6 will become conducting. This will happen very smoothly. Thus the value of the resistor R32 specifies the level where the non-linear curve will start. When transistor Q6 is conducting, the value of the impedance Rg will decrease, so that the gain will increase. The gain depends on the resistance of resistor R33.

In FIG. 2, any numbers printed next to the resistors indicate the resistance. The gamma correction circuit provides an (anti-)gamma of two with a smooth, more or less quadratic transfer curve. It is simple as it uses only three transistors for the proper gamma correction. The base of transistor Q4 forms the non-inverting input (+) of the amplifier A. The emitter of transistor Q4 forms the inverting input (−) of the amplifier A. Resistors R19 and R32 of FIG. 2 correspond to the resistor R1 of FIG. 1. The resistor R20 of FIG. 2 corresponds to the feedback resistor R2 of FIG. 1. The output of the amplifier A supplies the output signal Vo to a plasma display D. Between the amplifier output and the display, other circuits may be present, such as a low-pass filter, an active clamp, and an A/D converter. In a color display apparatus, a separate gamma correction circuit may be present for each color.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of an integrated circuit.

What is claimed is:

1. A gamma correction circuit, comprising:

a clamp circuit coupled to receive an input signal;

an amplifier coupled to said clamp circuit to receive a clamped signal; and a non-linear impedance coupled to said amplifier for determining a gain of the gamma correction circuit in such a manner that the gain increases when the input signal increases, wherein said non-linear impedance comprises a transistor, a main current path of said transistor being coupled between an inverting input of said amplifier and ground.

2. A gamma correction circuit comprising:

an amplifier coupled to receive an input signal; and a non-linear impedance coupled to said amplifier for determining a gain of the gamma correction circuit in such a manner that the gain increases when the input signal increases, wherein said amplifier comprises:

a first transistor having a base forming a non-inverting input of said amplifier, an emitter forming an inverting input of said amplifier, and a collector coupled to a supply terminal through a resistor; and a second transistor having a base connected to the collector of the first transistor, an emitter coupled to the supply terminal, and a collector coupled to an output of said amplifier.

3. A display apparatus, comprising: a gamma correction circuit for furnishing a display signal, said gamma correction circuit comprising:

a clamp circuit coupled to receive an input signal;

an amplifier coupled to said clamp circuit receive a clamped signal; and a non-linear impedance coupled to said amplifier for determining a gain of the gamma correction circuit in such a manner that the gain increases when the input signal increases; and a linear display for displaying said display signal, wherein said non-linear impedance comprises a transistor, a main current path of said transistor being coupled between an inverting input of said amplifier and ground.

* * * * *